United States Patent [19]
Caroli

[11] Patent Number: 5,657,169
[45] Date of Patent: Aug. 12, 1997

[54] LENS AND METHOD OF MAKING SAME

[75] Inventor: Italo Caroli, Westmount, Canada

[73] Assignee: DBM Reflex Enterprises Inc., Montreal, Canada

[21] Appl. No.: 284,517

[22] PCT Filed: Feb. 1, 1993

[86] PCT No.: PCT/CA93/00022

§ 371 Date: Sep. 27, 1994

§ 102(e) Date: Sep. 27, 1994

[87] PCT Pub. No.: WO93/16324

PCT Pub. Date: Aug. 19, 1993

[30] Foreign Application Priority Data

Feb. 5, 1992 [CA] Canada ................. 2060703

[51] Int. Cl.[6] .................................. G02B 3/00
[52] U.S. Cl. .................. 359/737; 385/115; 362/332
[58] Field of Search .................. 362/336, 332, 362/32; 385/115, 901; 359/707, 737

[56] References Cited

U.S. PATENT DOCUMENTS

| Re. 34,318 | 7/1993 | Davenport et al. | |
|---|---|---|---|
| 1,618,010 | 2/1927 | Hoss | 362/348 |
| 3,258,840 | 7/1966 | Hedgwick et al. | 29/471.1 |
| 3,548,041 | 12/1970 | Steding | 264/1 |
| 3,632,695 | 1/1972 | Howell | 264/1 |
| 3,741,623 | 6/1973 | Mihalik | 350/103 |
| 3,817,596 | 6/1974 | Tanaka | 350/103 |
| 3,833,285 | 9/1974 | Heenan | 350/103 |
| 4,198,182 | 4/1980 | Green | 409/132 |
| 4,349,598 | 9/1982 | White | 428/161 |
| 4,478,769 | 10/1984 | Pricone et al. | 264/1.6 |
| 4,588,258 | 5/1986 | Hoopman | 350/103 |
| 4,637,950 | 1/1987 | Bergeson et al. | 428/168 |
| 4,682,852 | 7/1987 | Weber | 350/105 |
| 4,740,276 | 4/1988 | Marmo et al. | 204/7 |
| 4,743,410 | 5/1988 | Grethen et al. | 264/1.4 |
| 4,775,219 | 10/1988 | Appledorn et al. | 350/103 |
| 4,862,330 | 8/1989 | Machida et al. | 362/336 |
| 4,952,022 | 8/1990 | Genovese | 385/115 |
| 5,222,180 | 6/1993 | Kuder et al. | 385/115 |

FOREIGN PATENT DOCUMENTS

| 0404629 | 12/1990 | European Pat. Off. . |
|---|---|---|
| 956566 | 1/1957 | Germany . |
| 2230584 | 12/1972 | Germany . |
| 3305218 | 8/1984 | Germany . |
| 55-090920 | 10/1980 | Japan . |

*Primary Examiner*—Georgia Y. Epps
*Assistant Examiner*—Thomas Robbins
*Attorney, Agent, or Firm*—David L. Davis

[57] ABSTRACT

A lens (10) is disclosed for use on automotive vehicles and which forms part of lamp assemblies used on the rear, front or side surfaces thereof. The lens utilizes a combination of optical elements (25) and reflex elements (24) interspersed therewith, the density of the reflex elements (24) relative to the optic elements (25) being graduated in selected areas of the lens surface, for example from the stop or brake light area (12) of the lens through the "running light" area (14) to a fog area (16). One form of the invention has the optic elements (25) and the reflex elements (24) on a single lens surface and, in another embodiment, the optic elements (25) of the lens (10) are located on one lens surface (52) and the reflex elements (24) are located in juxtaposition outwardly thereof on a second lens surface (48) and spaced from one another so that the reflex elements (24) are axially interspersed between the optic elements (25). The method of manufacturing both forms of lenses is also disclosed.

9 Claims, 7 Drawing Sheets

LENS AND METHOD OF MAKING SAME

FIELD OF THE INVENTION

This invention relates to a lens and the method of making it and in particular to a lens for use on lamp assemblies of an automotive vehicle, for example a rear lamp assembly, and comprises a combination of optic elements and reflex elements.

BACKGROUND OF THE INVENTION

Conventionally, the outer lens portion of automobile lamp assemblies whether used on the rear, front or side surfaces thereof, have been divided into two or more distinct sections. At least one of these sections includes optical elements which transmit light from a light source in the assembly outwardly thereof, as is the case in the "taillight" sections or "brake light" sections, and another section made up of reflex elements the purpose of which is to reflect light from an exterior light source directed at the lamp assembly. As an example, optical elements of the lens are located outwardly of a light source in the body of the assembly. The optical elements, or optics as they are sometimes referred to, direct and transmit a first light source, for example a taillight bulb, and they also serve to direct and transmit the stronger light resulting from a brake application, or a directional signal in the case of a front or side located assembly, resulting from a higher intensity bulb being brought into play with a brake application or directional signal actuation. The reflex portion of the assembly consists of an arrangement of a plurality of multi-faceted elements that provide a reflective brilliance to a light source directed at the assembly from the exterior thereof, for example, from the head lights of another automobile being directed at a rear lamp assembly incorporating the reflex elements in question. The brilliance of the reflective elements must meet standards set by various countries.

Examples of the prior art may be found in German Offenlegungsschrift 2 230 584, 28 Dec. 1972,
U.S. Pat. No. 3,632,695 of Jan. 4, 1972; and
U.S. Pat. No. 4,198,182 of Apr. 15, 1980.

DE-A-2 230 584 illustrates a plane of optical elements parallel with a plane of reflex elements.

U.S. Pat. No. 3,632,695 discloses a method of making a combined lens and reflector in which a plurality of pins having shaped ends are assembled in a bundle and replacing portions of the shaped ends where optical elements are to be formed. A mold is electroformed over the shaped ends and subsequently the electroform mold is shaped at the areas of the optical elements to form the desired optical surfaces.

U.S. Pat. No. 4,198,182, there is disclosed a lamp lens mold in which the mold plate has a plurality of recesses in one face thereof and in which each of the recesses is adapted to produce a projection on one face of the lens element and is shaped so as to define in the projection a lens integral with and overlying a prism.

Automotive lamp assemblies and their lenses are relatively simple to manufacture when the areas of the vehicles on which they are mounted are relatively flat. However, with the evolution of automobile bodies that are more smoothly contoured both on rear surfaces as well as the front surfaces thereof to reduce the coefficient of drag, it has become more difficult to manufacture suitable lenses that will blend into these contours and which will still provide the desired degrees of reflective and optically transmitted brilliance of stop lights, taillights, directional signal lights and fog lights.

There is also a need for a single, unitary lens which will meet the needs for application to automotive vehicles that have smoother, rounded styling and yet which can be tailored to the specific functions of the lamp assembly for a particular vehicle. For example, lamp assemblies on automobiles must function with regard to the front and rear portions of the vehicle and, to meet safety requirements of certain countries, the lamp assemblies must have lenses that extend into portions of the side surfaces of the vehicle. There is often compound curvatures to the surfaces that the lenses must match.

Design requirements for the newer generation of automobiles also dictate preferences that the reflective areas of the lamp assemblies be integrated with the tail and stop light areas of the assembly and the fog light areas of European assemblies.

The requirements for the new contoured lamp assemblies and lenses provide challenges for the manufacturer of the lenses as well. Conventionally, the lenses have optical elements as well as reflex elements and were manufactured by assembling a large plurality of reflex pins into a packet or bundle thereof, if necessary forming a mold by electro-depositing metal on the shaped ends of the reflex pins and then using the resulting electro-form to inject a plastic material thereon to form the reflected surfaces.

The reflex portions of the lens would be used in combination with optical elements resulting from the optics being machined on to a metal block which was added to the bundled reflex pins or an electro-form therefrom. The unitary piece of plastic material manufactured from the block-machined optics and the bundled reflex pins provided a combined lens and reflector whereby the unit could both transmit and direct light from a light assembly source and to reflect light from for example another vehicle.

By integrating reflex elements into light assemblies which follow the contour of the body of a vehicle, the pins, as well as optics, are positioned in the blocks so that the rearward reflection or the transmitted direction of the finished optics takes place in a direction which is parallel to the longitudinal axis of the vehicle or as close to that as possible.

SUMMARY OF THE INVENTION

An automotive lamp assembly lens according to the invention provides an automotive designer with a very flexible styling principle in the lamp assemblies relative to the automotive body in that the function of various sections of the lens can be spread throughout the length thereof and still meet the previously mentioned requirements for brilliance and light transmission. The reflex elements are interspersed amongst the optical elements and the reflex elements can in effect be used as a styling tool and spread over the contour of the lens in a way that tends to make the reflex elements disappear. The reflex elements are manufactured in such a way as to provide a cylindrical or "circular prisms" in the finished product. The diameter of the circular prisms can be constant throughout the surface of the lens or they can vary in size, depending on the functional and styling requirements.

A lens according to the invention may have reflex zones consisting of reflex elements of graduating density interspersed between optical elements located therebetween or inwardly thereof on another lens surface, the density of the location of the reflex elements being changeable in the manufacturing process to meet both requirements of different functions of the lens and standards for the lens set by the requirements of different countries.

The lens can be manufactured by more than one process. In one method of manufacturing, a solid metal master is drilled to locate the reflex pins therein, the optical elements being machined into the surface of the metal master. An electro-form is then made on the surface of the metal master and a single plane lens is then injection molded on the surface of the electro-form to provide the desired combination of optical and reflex areas on the surface of the lens.

In another form of manufacture, the reflex pins are spaced from one another at desired locations by blade members of a given depth at which, when secured together, provide the equivalent of a solid master. An electro-form is subsequently made of the surface of the blades and the portions of the pins projecting therefrom and a plastic lens is injection molded thereon. This provides a single, outer lens of reflex elements which are so located as to be interdispersed between optical elements that are formed on a second lens surface spaced inwardly of the reflex lens surface. The optics are so located as to transmit and direct light outwardly and between the locations of the reflex elements.

A lens according to the invention provides a plurality of spaced reflex, circular prisms which can be graduated in density in any area of the lens to meet the desired style and required functions of light transmission and reflectivity. In one form the lens is a single planar member having both optical elements and reflex elements interspersed therewith throughout the surface of the lens. In another example, the lens is of a two plane or double plane construction having an inner layer of optical elements to be located outwardly of a light source of the assembly and an outer layer of reflex elements spaced so that they are visually and functionally interspersed with the location of the optic elements. In either form, the lens meets the current requirements for applications to automotive body work having smoother, rounded styling and can be tailored to such contours. The lens can be used as a styling element, for example an accent line of reflex elements, or by aligning the reflex elements in such a way as to be a styling function. To meet regional requirements, the circular prisms can be concentrated in certain reflex areas.

The method of manufacturing a lens according to the invention provides a flexibility of changing the density of the elements to meet various formal regulations. The dispersion of the reflex elements in the manufacturing process makes it easier to follow curved surfaces and the like in the finished product.

According to one broad aspect, the invention relates to a lens for use in combination with a lamp assembly of an automotive vehicle. The lens comprises a combination of optical elements and reflex elements interspersed therewith and arranged across the surface of the lens. The density of the reflex elements relative to the optic elements being graduated in selective areas of the lens. The optic elements and reflex elements can be arranged on a single lens surface or the optic elements of the lens can be on one lens surface and the reflex elements on another surface, spaced from one another and axially interspersed between the optic elements.

The lens may be subdivided into a plurality of zones each of which may display a different percentage of reflex elements relative to an adjacent zone. The density of the reflex elements may increase from one zone to another and the size of the reflex elements may increase with the density thereof, one zone to another.

According to another broad aspect, the invention relates to a method of manufacturing a lens for use in combination with a lamp assembly of an automotive vehicle, the method comprising the steps of forming a solid master mold, machining optical elements on the surface of said mold, drilling apertures in said master mold and locating reflex pins in said apertures and interspersed between said optical element portions of the mold, making an electro-form of the surface of said master mold and injection molding a plastic lens on the surface of said electro-form.

According to a further aspect, the invention relates to the manufacture of a lens for use in combination with a lamp assembly of an automotive vehicle, the method comprising providing a plurality of blade members in the configuration of a master mold, locating a plurality of reflex pins between and clamped by said blade members, clamping said blade members together to form a master mold therefrom, making an electro-form of the surface of said blade master mold; and injection molding a plastic lens from said electro-form surface to provide an outer lens member with spaced reflex elements thereon; providing a steel mold, machining a plurality of optical element contours in the surface of said steel mold, and injection molding a plastic lens on said mold to provide an inner lens surface of optical elements; the reflex elements on the outer lens surface being so located as to be interspersed between the centers of the optic elements on the inner lens surface.

BRIEF DESCRIPTION OF THE DRAWINGS

The invention is illustrated byway of example in the accompanying drawings in which.

DESCRIPTION OF THE PREFERRED EMBODIMENT

FIGS. 1 through 5 of the drawings show several examples, in elevation view, of a lens for use on a lamp assembly of an automotive vehicle. While the invention is applicable to front, rear or side lamp assemblies, for the purposes of this description, reference will be made to a lens for a rear lamp assembly. FIGS. 1 through 5 differ in their disclosures of several examples of various densities of reflex elements with respect to the overall surface of the lens.

Figure 1:
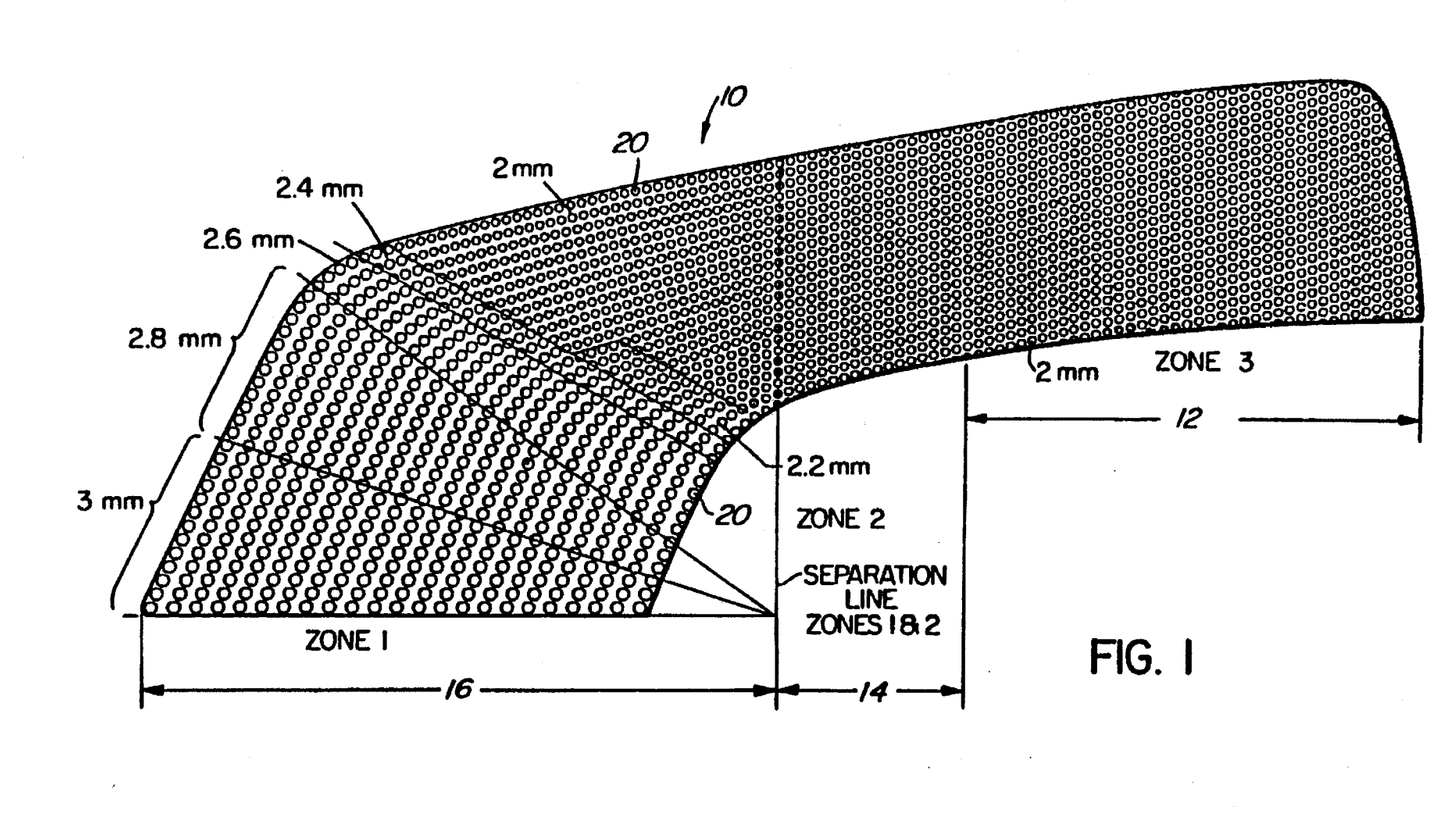
FIG. 1 is an elevation, planar view of one example of a lens according to the invention.

Referring first to FIG. 1, the lens indicated generally at 10 can be of any desired configuration to match the contour of a specific automobile shape and the configuration of the lens in FIGS. 1 through 5 are therefore representative only of one possibility of a design. Lens 10 for the purposes of this description, would be molded entirely from red plastic and could be combined with other lenses which might provide for example backup lights and directional signals. The illustrated example of the lens 10 has three sections, a combined taillight and stop area 12, a tail or running light section 14 and a fog section 16. While fog sections or areas in rear lamp assemblies are not always required or utilized on the North American continent, they are widely used in Europe and this particular section of the tail lamp assembly is illuminated by intense brightness when fog lights are switched on. Section 14 is the area of the assembly and the lens that is illuminated at all times when the lights are switched on and of course the stop light area provides heightened brilliance from extra filaments in the running light bulbs in the assembly or from extra stop light bulbs when the automobile braking system is applied.

FIG. 1 illustrates the pattern of circular prisms 20 across the lens. While "circular prism" seems a contradiction in terms, reference to FIG. 8 will show that the hexagonal reflex pin is turned to a cylindrical configuration on its outer end but still retains it cubic face.

In FIG. 1, the circular prisms 20 are arranged so that they accentuate a line generally defining the longitudinal line of the lens itself. Moreover, the density of the circular prisms 20 in the area of the lens toward section 12 is greater than that in the fog area 16. Additionally, the size of the prisms increases from 2 mm in the stop area as well as a portion of the taillight area where they are approximately 2 mm in diameter to gradually increasing sizes from 2.4 mm, 2.6 mm, 2.8 mm up to 3 mm in diameter in the fog area 16.

Figures 2, 2A:
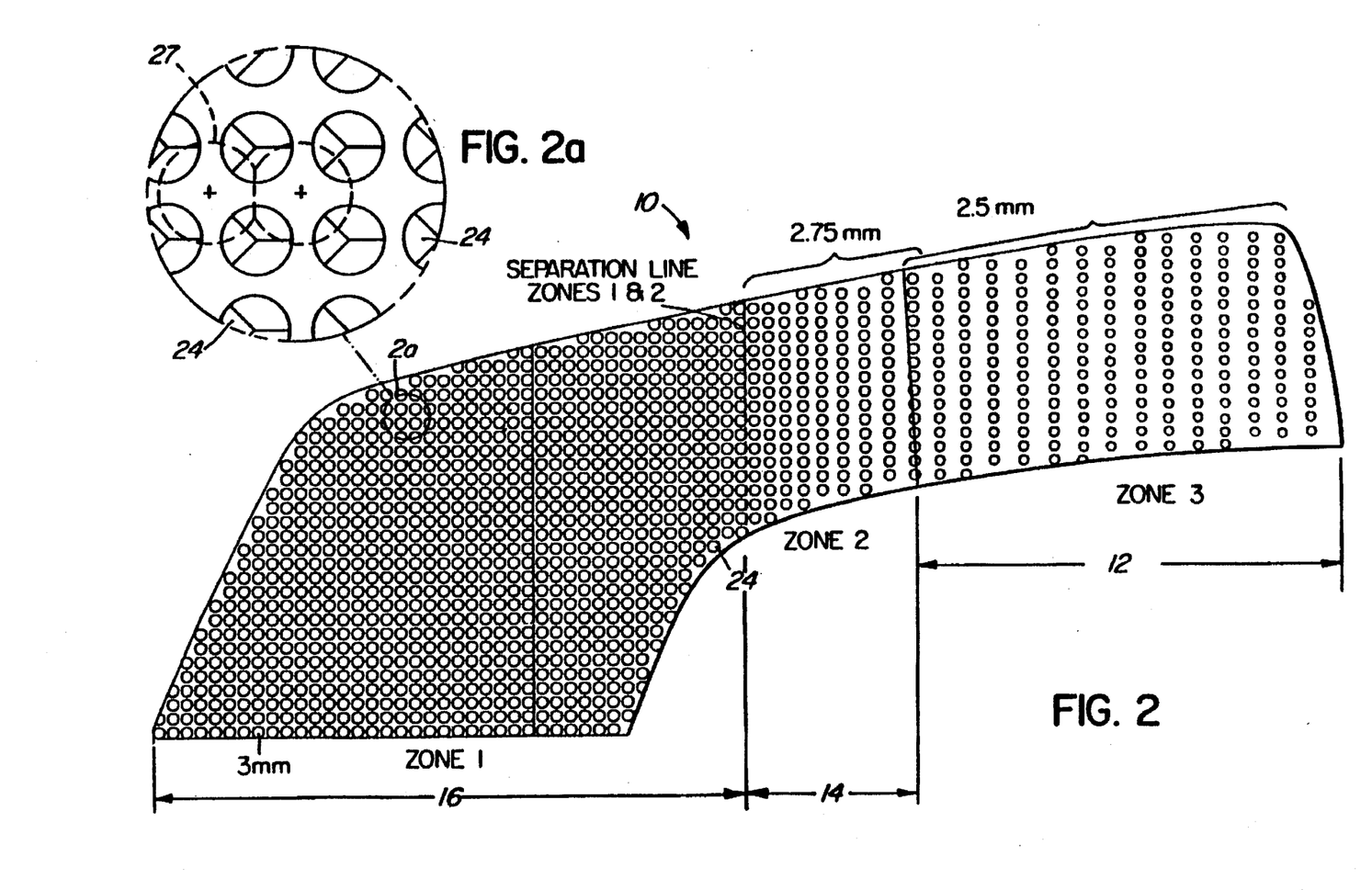
FIG. 2 is a view similar to FIG. 1 but showing a different pattern of circular prisms thereon.
FIG. 2a is an enlarged portion of FIG. 2.

In FIG. 2 the prisms 20 increase in size from 2.5 mm in the taillight-stop light section 12 through to an increase in size of 2.75 mm in the running light section 14 and they increase in that area in density as well towards and including the fog area 16. In this example, the circular prisms extend generally vertically and horizontally to provide a completely different styling effect than in FIG. 1. The spacing of the circular prisms is indicated more clearly in the enlarged view of FIG. 2a.

In FIG. 1 the circular prisms incorporate approximately 41% of zone 2 of the lens 10. In FIG. 2, the reflex area constitutes approximately 50% of the zone 1 of the lens.

Figures 3, 3A:
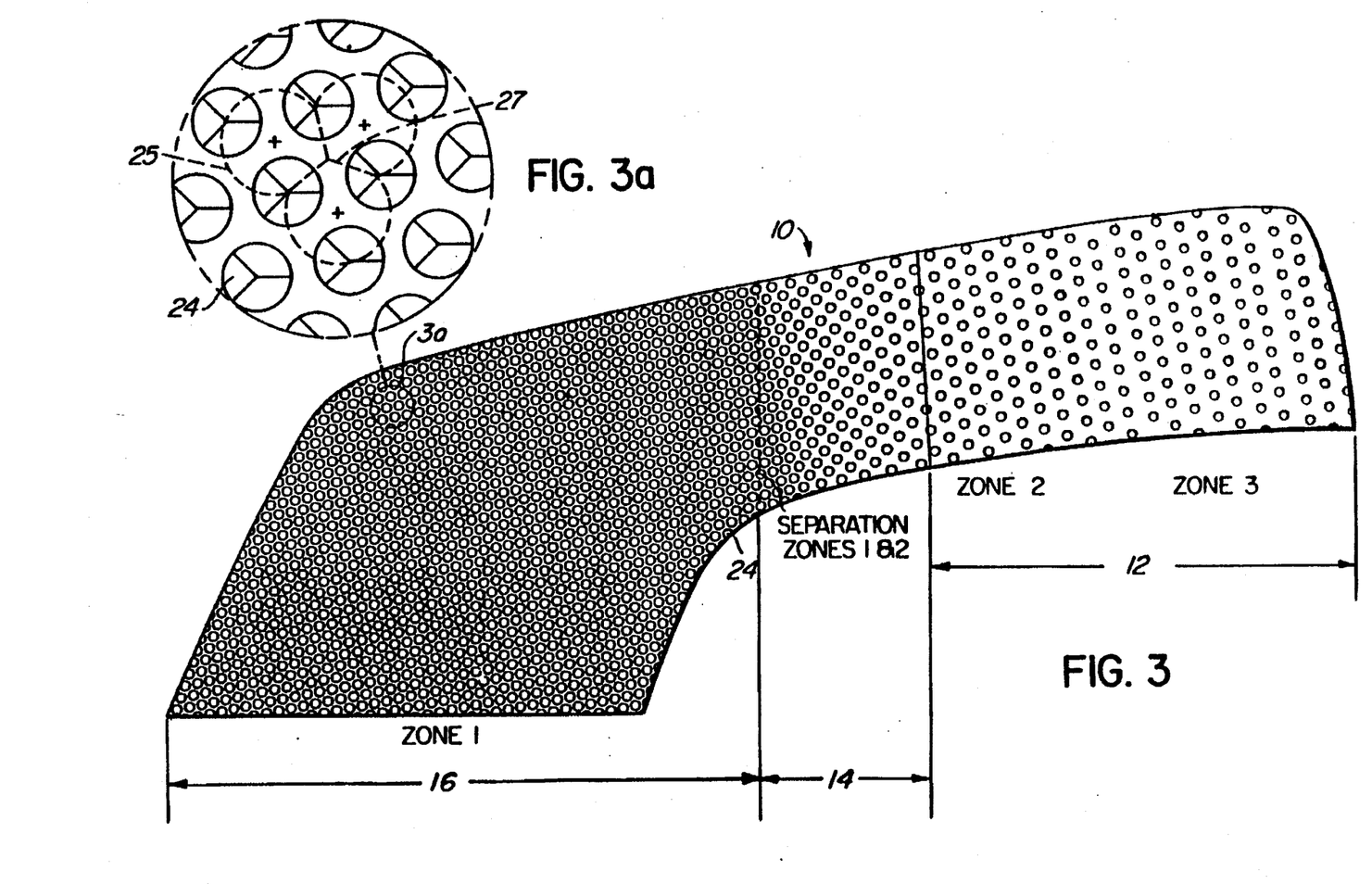
FIG. 3 is a view similar to FIG. 1 but showing a still further arrangement of prisms over the surface of the lens.
FIG. 3a is an enlarged plane view of the area indicated as 3a on FIG. 3 and showing the relationship between the reflex elements as they overlie and are interspersed with the optic elements.

In FIG. 3, there is a constant density of circular prisms 24 in the fog area 16 and into a portion of the taillight area 14 and, towards the stop light area 12, the density begins to disperse with greater spacing between the prisms. Thus, part of the taillight and the fog light area of the lens will provide a greater reflective brilliance.

Figure 4:
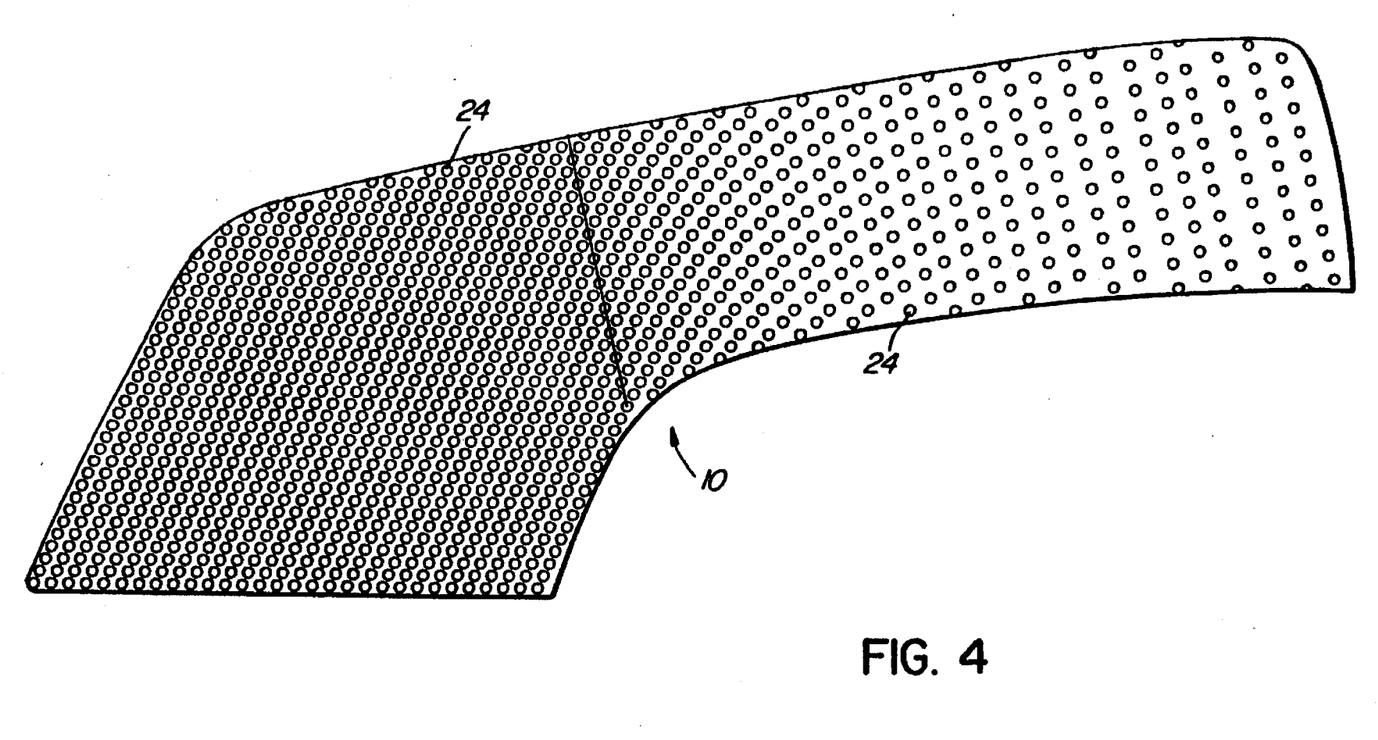
FIG. 4 is yet another example of the density of circular prisms on the surface of the lens.
Figure 5:
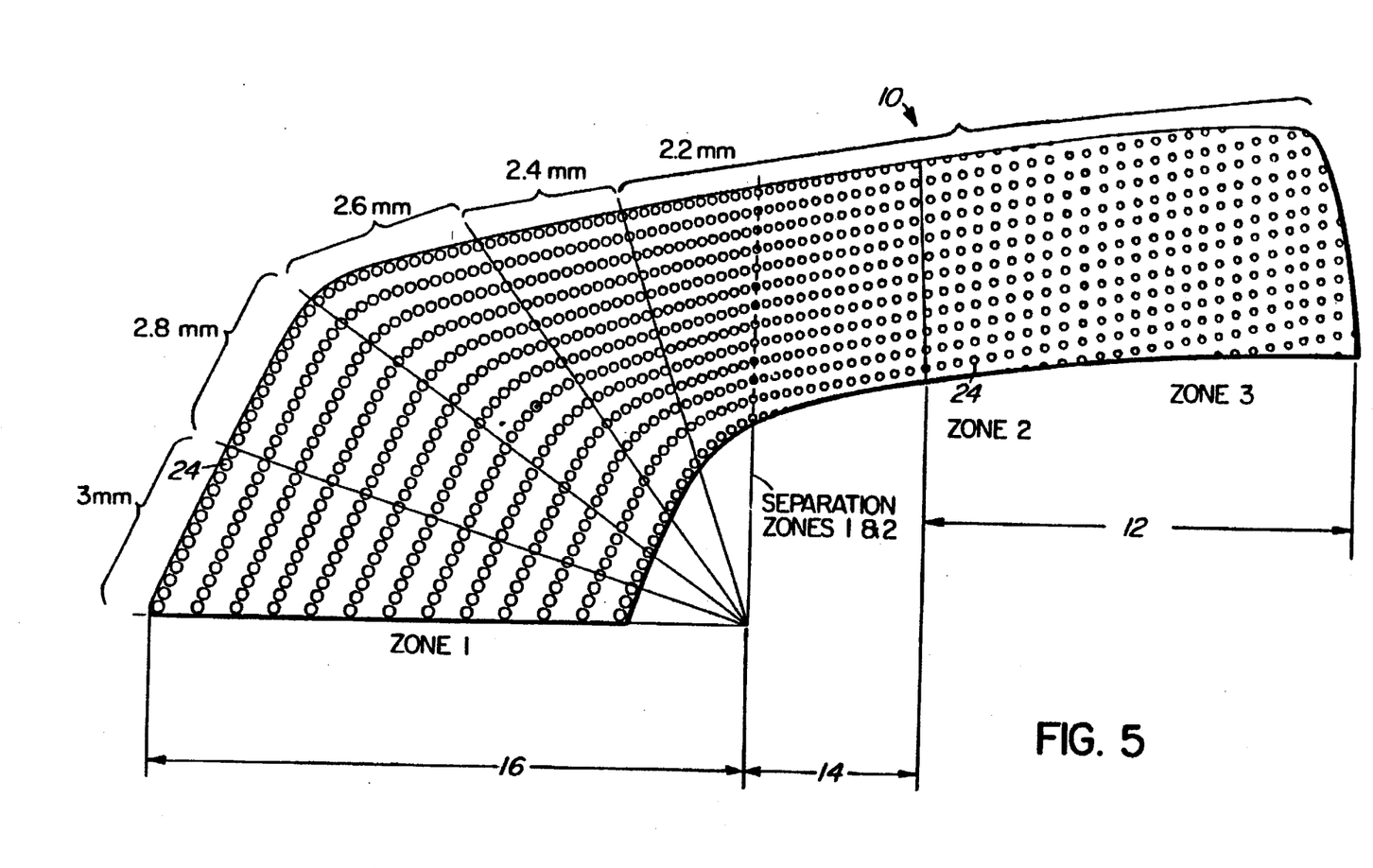
FIG. 5 is a view similar to FIG. 1 and displays zones of different prism densities throughout the lens surface.

In FIG. 4, a further example is shown where the circular prisms 24 comprise approximately 40% of the surface of the lens and, in FIG. 5, an example is illustrated where the circular prisms 24 comprise approximately 22% of the total area of the fog section of the lens 10 and the prisms change in density towards and into the taillight and stop light areas 14 and 12 respectively. As shown, the prisms have a graduation in size from 2.2 mm up to 3 mm towards the fog or larger area of the lens surface.

Figure 6:
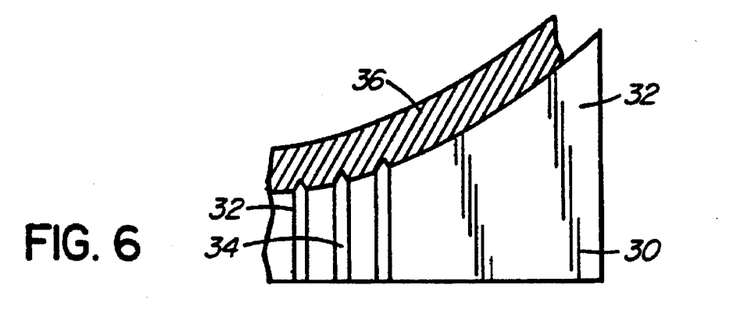
FIG. 6 is a schematic view of a portion of a master mold according to one aspect of the invention.
Figure 7:
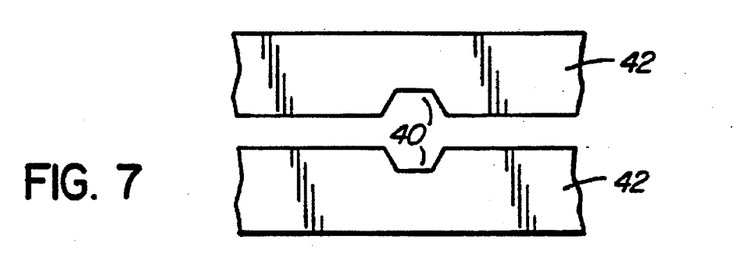
FIGS. 7 and 8 are segmental plane views of portions of blade members of a master mold made therefrom.

Turning now to FIGS. 6 through 11, two methods of manufacturing a lens are disclosed. In FIG. 6, a solid metal master 30 is contoured as at 32 to provide the desired curvature and that curvature is machined to provide the optic elements (for example as shown in FIG. 3a) on the surface thereof and the master is then drilled as at 33 to receive the desired number of reflex pins 34. Suitable means may be utilized, such as a flat surface, for providing proper alignment of the pins 34 in the apertures 33.

An electro-form 36 is then made on the surface of the metal master, the electro-form taking the configuration of the reflex pins and optical elements from the surface of the master. A single plane lens is then manufactured by injecting molding a plastic over the surface of the electro-form, the result being the desired combination of optical and reflex areas on the surface of the single plane lens.

Figure 8:
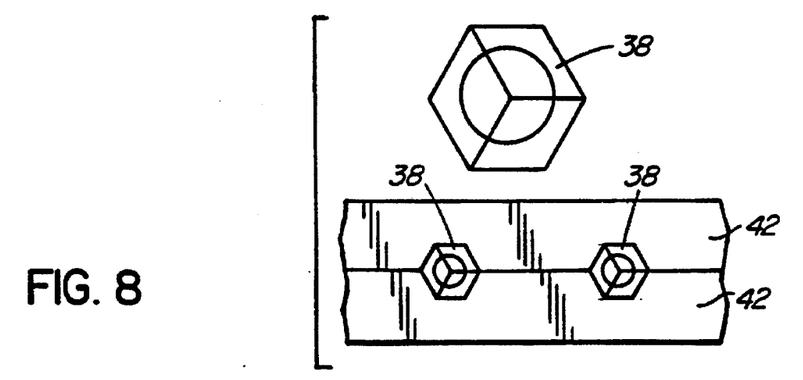
Figure 9:
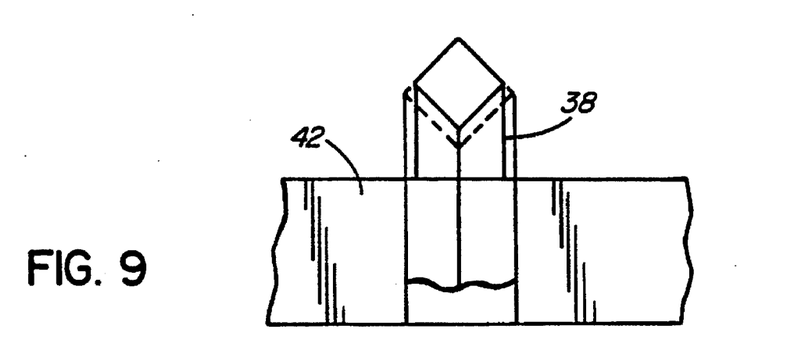
FIG. 9 is an elevation view of a portion of a blade member and a reflex pint herein.
Figure 10:
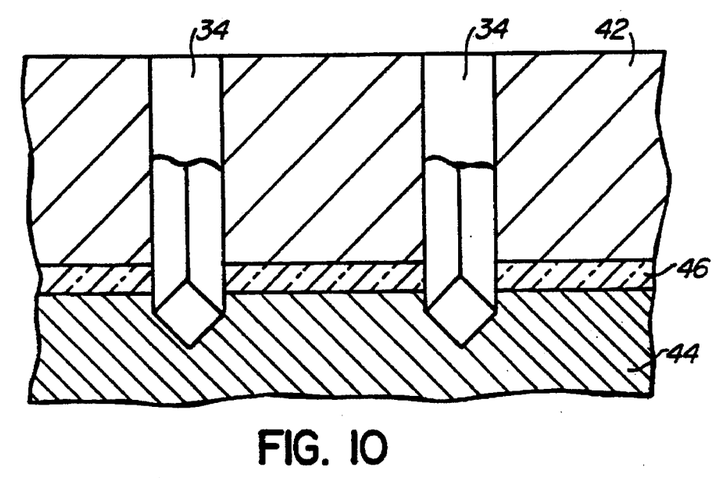
FIG. 10 is a segmented portion of a master mold, electro-form and lens therebetween.
Figure 10A:
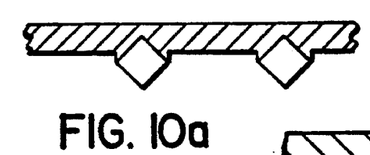
FIG. 10a is a cross-section of the lens.
Figure 11:
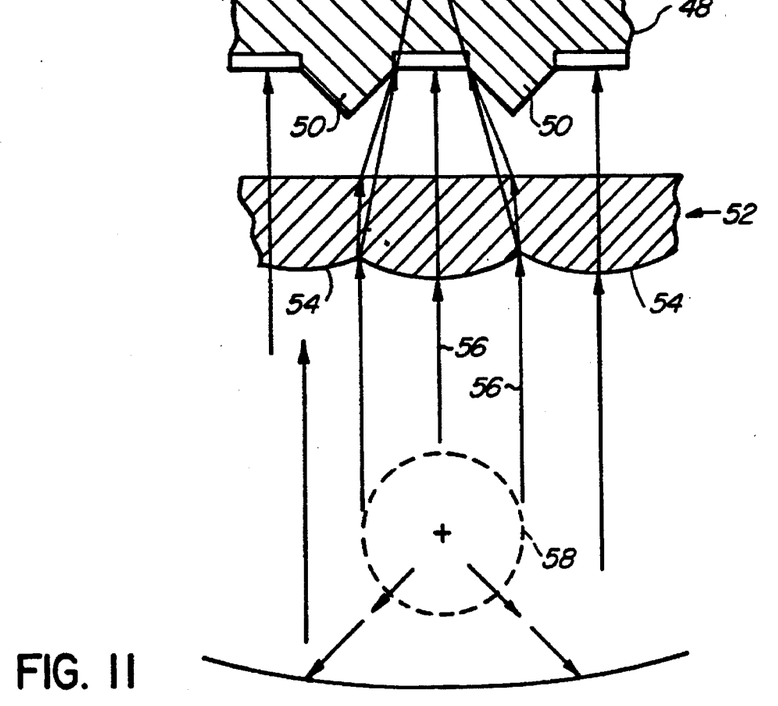
FIG. 11 is a schematic, cross-sectional view of a portion of a lamp assembly showing inner and outer lens surfaces according to the invention.

In another form of manufacture shown in FIGS. 7-10, the reflex pins 38 are located by means of a series of blade members grooved at suitable locations such as 40 to locate the hexagonal profiles of the bodies of the reflex pins, the outer ends of which have been machined into a cylindrical form as shown in the bracketed portion of FIG. 8. The blades 42 are manufactured in a configuration which, when they are secured together with the pins therebetween, are the equivalent of the solid master 30. Using a mold made up from the blades 42 with the pins 38 secured therein an electro-form 44 is then made of the pin heads as shown in FIG. 10 and a plastic lens is then manufactured by injecting molding the plastic as at 46. A lens 48 manufactured according to this process is a single plane lens with the circular prisms 50 located thereon as shown in FIG. 11. Located in juxtaposition to that lens 48 is an inner lens 52 of optical elements 54 only and the location of these optical elements relative to the reflex elements or circular prisms 50 is such that a beam of light 56 from a source 58 thereof is directed as indicated by the arrows, by the optics 54 through the outer lens 48 between the circular prisms 50. This is shown in plan view on FIG. 3a.

The lens 52 as shown in FIG. 11 would be manufactured by providing a solid metal mold 30 in FIG. 6 and grinding the surface of that mold to provide the desired number, size and location of optic elements which, when the lens is made therefrom, would provide the optics 54 as shown in FIG. 11.

In an arrangement such as that shown in FIG. 11 where two lens surfaces are juxtaposed one to another, the outer lens 48 would of course be red and the inner lens 52 would be clear whereas in a single lens design, a red plastic would be used.

Turning now to FIGS. 2a and 3a, the location of the optic elements follows the location of the reflex elements or circular prisms. As shown in FIG. 3a, the circular prisms 24 overlie optic elements 25 which are centered between every three circular prisms, when a pattern such as FIG. 3 is used. The optic elements are circularly ground and, where they overlap, a flat border area 27 would result.

In FIG. 2a, the pattern of the circular prisms 24 is somewhat different with the result that an optic element 27 is located in the center of every four circular prisms. It will be appreciated that, a lens manufactured according to the invention provides unique visual appearance having the light transmitted from the interior light source by the optical elements through those areas on the lens surface not occupied by the circular prisms 24. Additionally, the reflex prisms are dispersed over the whole surface of the lens rather than being located in one particular strip or block as is the conventional practice.

For regulation purposes, the reflex area of the lens is measured within a 10 inch diameter circle and for most applications this area is further limited to the zone where reflex density is highest. For example, in FIG. 1 this would be zone 2. In all other zones of the lens that carries the interspersed reflex, simulated reflex elements could be used and which would have an appearance as close as possible to rear reflex but with no reflex function. By such an arrangement, there could be a substantial reduction in the cost of the mold. In such a case, the effective reflex zone would be produced as described herein while the simulated reflex zone would be produced by machining simulated round prisms into a metal block, such as steel. This machining could be done by drilling or by coining or both. With such a method, the mold for the outer lens would be made of a plurality of metal elements; electro-forms for the effective reflex zone, and metal blocks such as steel, machined for the simulated reflex zones.

While the invention has been described in connection with a specific embodiment thereof and in a specific use, various modifications thereof will occur to those skilled in the art without departing from the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

I claim:

1. A lens for use in combination with a lamp assembly of an automotive vehicle, wherein the lens (10) comprises a combination of optical elements (25) and reflex elements (24) interspersed therewith and arranged across the surface of the lens; characterized in that the density of the reflex elements (24) relative to optical elements (25) are graduated in selective areas of the lens, said reflex elements being spaced from one another and interspersed with said optical elements.

2. A lens according to claim 1 characterized in that the optical elements (25) and the reflex elements (24) are arranged on a single lens surface.

3. A lens according to claim 1 characterized in that the optical elements (54) are located on one, optical, lens surface (52) and the reflex elements (50) are located on another, reflex, lens surface (48) mounted in juxtaposition to said one optical lens surface, the reflex elements (50) being spaced from one another and axially and visually interspersed with the optical elements.

4. A lens according to claim 1 characterized in that the lens (10) is subdivided into a plurality of zones (12, 14, 16) each of which has a different percentage of reflex elements (24) relative to said optical elements (25).

5. A lens according to claim 2 characterized in that the density of the reflex elements (24) increases from one zone to another.

6. A lens according to claim 1 characterized in that the diameter of the reflex elements (24) increases with the density thereof, one zone to another.

7. A lens according to claim 1 characterized in that the reflex elements (24) of one size are interspersed with those of another size.

8. A method of manufacturing a lens according to claim 1 for use in combination with a lamp assembly of an automotive vehicle, wherein the method comprises the steps of:

(a) forming a solid master mold (30); and (b) machining optical elements (25) on the surface of said mold;

characterized in the steps of (c) drilling apertures (32) in said master mold (30) and locating reflex pins (34) in said apertures (32) and interspersed between said optical element (25) portions of the mold; and (d) making an electro-form (36) of the surface of said master mold (30) and injecting molding a plastic lens on the surface of said electro-form.

9. A method of manufacturing a lens according to claim 1, for use in combination with a lamp assembly of an automotive vehicle, characterized in that the method comprises:

(a) providing a plurality of blade members (42) in the configuration of a master mold;

(b) locating a plurality of reflex pins (38) between and clamped by said blade members (42);

(c) clamping said blade members together to form said master mold therefrom;

(d) making an electro-form (44) of the surface of said blade master mold;

(e) injection molding a plastic lens from said electro-form surface to provide an outer lens member (48) with spaced reflex elements (50) thereon;

(f) providing a metal mold, machining a plurality of optical element contours (54) on the surface of said mold;

(g) injection molding a plastic lens (52) on said mold to provide an inner lens surface of optical elements (54); and (h) said reflex elements (50) on the outer lens surface (48) being so located as to be interspersed between the centers of the optic elements and the inner lens surface.

* * * * *